F. C. McDONALD.

FASTENING DEVICE.

APPLICATION FILED DEC. 22, 1920.

Reissued Feb. 15, 1921. 15,042.

Witness
Milton Lenoir

Inventor
Frances C. McDonald
By Adams & Hutton
Attorneys

UNITED STATES PATENT OFFICE.

FRANCES C. McDONALD, OF CHICAGO, ILLINOIS.

FASTENING DEVICE.

15,042. Specification of Reissued Letters Patent. Reissued Feb. 15, 1921.

Original No. 1,357,574, dated November 2, 1920, Serial No. 392,177, filed June 28, 1920. Application for reissue filed December 22, 1920. Serial No. 432,597.

*To all whom it may concern:*

Be it known that I, FRANCES C. McDONALD, a citizen of the United States, and a resident of Chicago, in the county of Cook, State of Illinois, have invented certain new and useful Improvements in Fastening Devices, of which the following is a specification, reference being had to the accompanying drawings.

My invention relates to fastening devices of a type adapted either to grip a button connected permanently with the device, as in the case of a hose supporter, or to grip a button mounted upon the part to be fastened independently of the fastening device as is common in children's clothes, in corsets, in supporters of various types, in curtain mountings, and in many other well known instances. Devices of this type have heretofore been produced involving the use of keepers held yieldingly in position by the resiliency of the device for preventing the withdrawal of the button from the engaging member, but such devices have not come into general use, so for as I am aware, and it is the object of my present invention to provide a new and improved form and arrangement of parts by which I am better enabled to obtain my desired results, by which the device is made stronger and more serviceable, by which it can be more readily and easily manipulated, and by reason of which it can be more cheaply and easily produced in large quantities. The preferred means by which I have accomplished my objects is illustrated in the drawings and is hereinafter specifically described. That which I believe to be new and desire to cover by this application is set forth in the claims.

In the drawings,—

Figure 1:
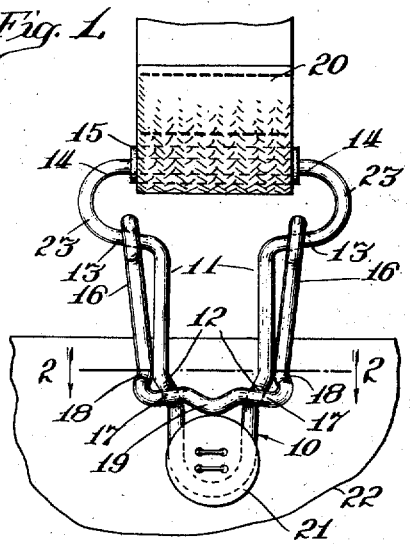
Figure 1 is a front face view of my improved fastening device mounted upon a supporting strap and engaging a button carried by a garment to be supported.
Figure 4:
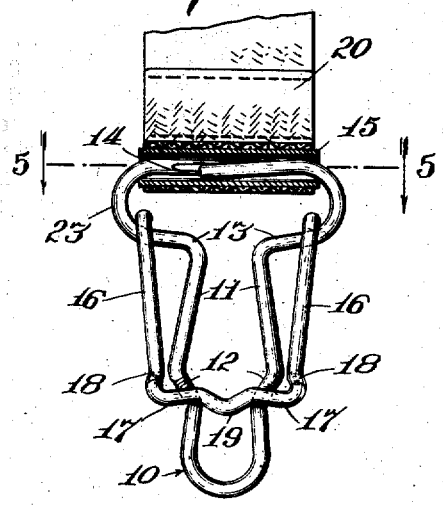
Fig. 4 is a view similar to Fig. 1, but partly in section, and with the device collapsed by pressure upon its sides for releasing the keeper.
Figure 3:
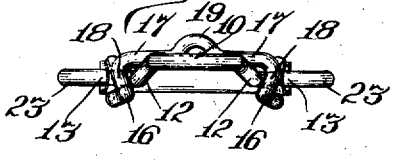
Fig. 3 is an end view of the device of Fig. 1 as seen from below in said figure.

Referring to the drawings in which corresponding parts are indicated by the same reference characters,—10 indicates the operative end portion of an engaging loop which in the construction illustrated is in the form of a wire bent into the shape of a letter U. A wider portion 11 of such loop is produced by the provision of offsets 12 in the sides of the loop, such offsets being directed diagonally outwardly and backwardly from the plane of the end portion 10 as will be appreciated by an inspection of Figs. 1 and 6. As is shown in Fig. 1, the sides of the wider portion 11 are substantially straight and parallel with each other, being provided at their upper ends with outwardly-extending arms 13. The arms 13, in turn, are provided with inwardly-extending arms 14 which extend into overlapping position within a sleeve 15, as is best shown in Fig. 4.

Figure 2:
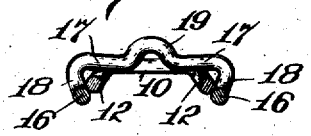
Fig. 2 is a horizontal section taken on line 2—2 of Fig. 1.
Figure 6:
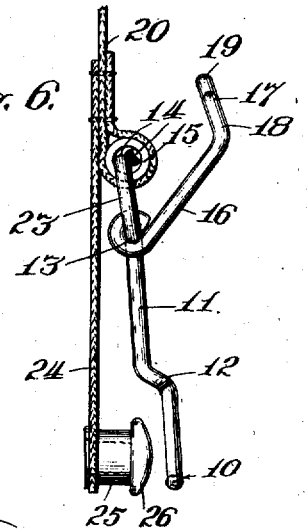
Fig. 6 is a side view of my improved fastening device as applied to a hose supporter.

A U-shaped keeper comprising arms 16 and a cross-bar 17 is pivotally mounted upon the outwardly-extending arms 13, of the loop member by means of eyes formed upon the arms 16 as is best shown in Fig. 6, the keeper being adapted to swing between a raised position as shown in Fig. 6 to a position in engagement with the loop as shown in the remaining figures. As is best shown in Fig. 6, the arms 16 are deflected at the point 18 adjacent to the cross-bar 17, whereby the said cross-bar will not interfere with the movement of the keeper into position to clasp the loop yieldingly at a point adjacent to the off-sets 12, as is clearly shown in Figs. 1 and 2. As is best shown in Fig. 2 the cross-bar 17 is provided with a projecting lip 19 by which an operator can obtain a hold upon the keeper for swinging it out of gripping position.

As shown in the several figures of the drawings the loop member of my fastening device is secured in position by stitching at the lower end of a strap 20 which extends about the sleeve 15. In Fig. 1 the operative end portion 10 of the loop is shown in engagement with a button 21 mounted by means of stitches upon a garment 22 a fragmentary portion of which is shown. In this figure the keeper is shown in operative position with the cross-bar 17 preventing the withdrawl of the button from the engaging loop, the keeper itself being held yieldingly in position by its engagement with the sides of the loop. When it is desired to release the fastening device from the button 21, pressure is applied to the side portions of the loop member at 23 for compressing or collapsing such members as is shown in Fig. 4 for moving the sides of the loop out of engagement with the keeper. The operator is then enabled very easily by means of the lip 19 to lift the keeper out of its operative position so as to permit the button to be moved upward with respect to the loop member into position to be withdrawn through the wider portion 11 of the loop.

In Fig. 6 the strap 20 is provided with a supplemental strap or supporting part 24 which is provided at its lower end with a button comprising a shank portion 25 and a head portion 26. Inasmuch as this arrangement of parts is well known in the art, it is believed to be unnecessary to describe the same further in detail herein.

Figure 5:
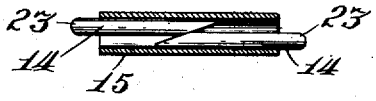
Fig. 5 is a horizontal section taken on line 5—5 of Fig. 4.

So far as I am aware I am the first in the art to provide a fastening device in the form of a loop comprising a narrow operative portion adapted to engage the shank of a button and a wider portion provided by reason of laterally-disposed offsets in the sides of the loop, with a keeper adapted to be held yieldingly in position across the loop adjacent to the offsets for preventing the withdrawal of the button from the operative end portion of the loop; to provide a keeper adapted to be held yieldingly in position across a loop adjacent to offsets in the side of the loop, such keeper being provided with a projecting lip extending at an angle with respect to the body of the keeper; or to provide a construction involving beveled overlapping ends of arms inclosed in a sleeve and adapted to be moved inwardly with respect to each other as is shown in Fig. 5. My claims are accordingly to be given an interpretation for assuring me protection in the use of these features.

What I claim as my invention and desire to secure by Letters Patent, is—

1. A fastening device of the class described, comprising a button-engaging member formed from a piece of wire bent at its central portion to form a loop at the lower end of such member and having its sides bent to form offsets that are directed outwardly and backwardly from the plane of said loop, in combination with a keeper formed from a piece of wire pivotally connected with said first-named member and bent into an approximate U-shape, the lower portion of the arms of the keeper being turned outward to permit the cross-bar member of the keeper to lie in front of the offsets in said button-engaging loop and the lower parts of the arms of the keeper to lie partially behind the sides of the button-engaging member.

2. In a fastening device of the class described comprising a button-engaging member formed from a piece of wire bent at its central portion to form a loop at the lower end of such member and having its sides bent to form offsets that are directed outwardly and backwardly from the plane of said loop, in combination with a keeper formed from a piece of wire pivotally connected with said first-named member and bent into an approximate U-shape, the lower portion of the arms of the keeper being turned outward to permit the cross-bar member of the keeper to lie in front of the offsets in said button engaging loop, and the straight lower parts of the arms of the keeper and their outwardly-turned portions lying, respectively, partially behind the arms of the button-engaging member and the said offsets that are formed therein.

3. A fastening device of the class described, comprising a button-engaging member formed from a piece of wire bent at its central portion to form a loop at the lower end of such member and having its sides bent to form offsets that are directed outwardly and backwardly from the plane of said loop, in combination with a keeper formed from a piece of wire pivotally connected with said first-named member and bent into an approximate U-shape, the lower portion of the arms of the keeper being turned outward to permit the cross-bar member of the keeper to lie in front of the offsets in said button-engaging loop and the lower parts of the arms of the keeper to lie partially behind the sides of the button-engaging member, said cross-bar member of the keeper being centrally bent to provide a forwardly-projecting lip for engagement by a finger of the user when swinging the keeper out of operative position.

FRANCES C. McDONALD.